US009751174B2

(12) United States Patent
Onsrud et al.

(10) Patent No.: US 9,751,174 B2
(45) Date of Patent: Sep. 5, 2017

(54) MULTIPLE TOOL CHANGER FOR MACHINING CENTER

(71) Applicants: Thomas Charles Onsrud, Mooresville, NC (US); Christopher John Sullivan, Statesville, NC (US)

(72) Inventors: Thomas Charles Onsrud, Mooresville, NC (US); Christopher John Sullivan, Statesville, NC (US)

(73) Assignee: C. R. Onsrud, Inc., Troutman, NC (US)

( * ) Notice: Subject to any disclaimer, the term of this patent is extended or adjusted under 35 U.S.C. 154(b) by 278 days.

(21) Appl. No.: 13/911,506

(22) Filed: Jun. 6, 2013

(65) Prior Publication Data

US 2013/0331244 A1 Dec. 12, 2013

Related U.S. Application Data

(60) Provisional application No. 61/656,621, filed on Jun. 7, 2012.

(51) Int. Cl.
*B23Q 3/157* (2006.01)
*B23Q 3/155* (2006.01)
(Continued)

(52) U.S. Cl.
CPC ..... *B23Q 3/15786* (2013.01); *B23Q 3/15506* (2013.01); *B23Q 3/15539* (2016.11);
(Continued)

(58) Field of Classification Search
CPC ............ B23Q 3/15506; B23Q 3/15706; B23Q 3/15766; B23Q 3/15793; B23Q 3/15786; B23Q 3/15539; B23C 1/04; B23C 1/08; Y10T 483/1717; Y10T 483/179; Y10T 483/1793; Y10T 483/1795; Y10T 483/1845; Y10T 483/1855; Y10T 408/368; Y10T 408/3806; Y10T 408/385; Y10T 409/307168; Y10T 409/307784; Y10T 409/308344; Y10T 409/308568
(Continued)

(56) References Cited

U.S. PATENT DOCUMENTS 5,068,958 A * 12/1991 Kosmowski ...................... 483/1
5,107,910 A * 4/1992 Sasaki .......................... 144/48.1
(Continued)

FOREIGN PATENT DOCUMENTS

DE GB 2271945 A * 5/1994 ............... B23Q 1/48

*Primary Examiner* — Sunil K Singh
*Assistant Examiner* — Michael Vitale
(74) *Attorney, Agent, or Firm* — Shumaker, Loop & Kendrick, LLP

(57) ABSTRACT

A numerically controlled machining center for performing work on a workpiece including a plurality of magazines holding a plurality of tools, each magazine positioned a first distance from an adjacent magazine, a plurality of spindles equal to the number of magazines and movable relative to one another independent of the positions of the magazines, the spindles movable apart from one another in a tool loading position to accommodate large magazine sizes and movable toward one another in a working position to allow the tools to work close together to minimize waste, and a table for supporting a workpiece.

12 Claims, 11 Drawing Sheets

(51) Int. Cl.
*B23Q 39/02* (2006.01)
*B23C 1/08* (2006.01)

(52) U.S. Cl.
CPC ..... *B23Q 3/15706* (2013.01); *B23Q 3/15766* (2013.01); *B23Q 39/023* (2013.01); *B23C 1/08* (2013.01); *Y10T 408/3806* (2015.01); *Y10T 409/307784* (2015.01); *Y10T 409/308344* (2015.01); *Y10T 483/10* (2015.01); *Y10T 483/179* (2015.01); *Y10T 483/1793* (2015.01); *Y10T 483/1845* (2015.01)

(58) Field of Classification Search
USPC ............ 483/37, 54, 55, 56, 63, 64; 409/192, 409/203, 213, 217; 408/34, 43, 53
See application file for complete search history.

(56) References Cited

U.S. PATENT DOCUMENTS

| | | | | |
|---|---|---|---|---|
| 5,584,788 | A * | 12/1996 | Piovano | 483/37 |
| 5,882,286 | A * | 3/1999 | Aufiero | 483/55 |
| 6,098,274 | A * | 8/2000 | Raiteri | 29/739 |
| 6,174,271 | B1 * | 1/2001 | Kosmowski | B23B 39/16 29/26 A |
| 6,688,352 | B2 * | 2/2004 | Marchioro et al. | 144/382 |
| 7,198,438 | B2 * | 4/2007 | Kosmowski | B23B 39/161 248/638 |
| 2009/0053004 | A1 * | 2/2009 | Yamaura et al. | 409/165 |
| 2011/0107573 | A1 * | 5/2011 | Fujioka et al. | 29/27 A |

* cited by examiner

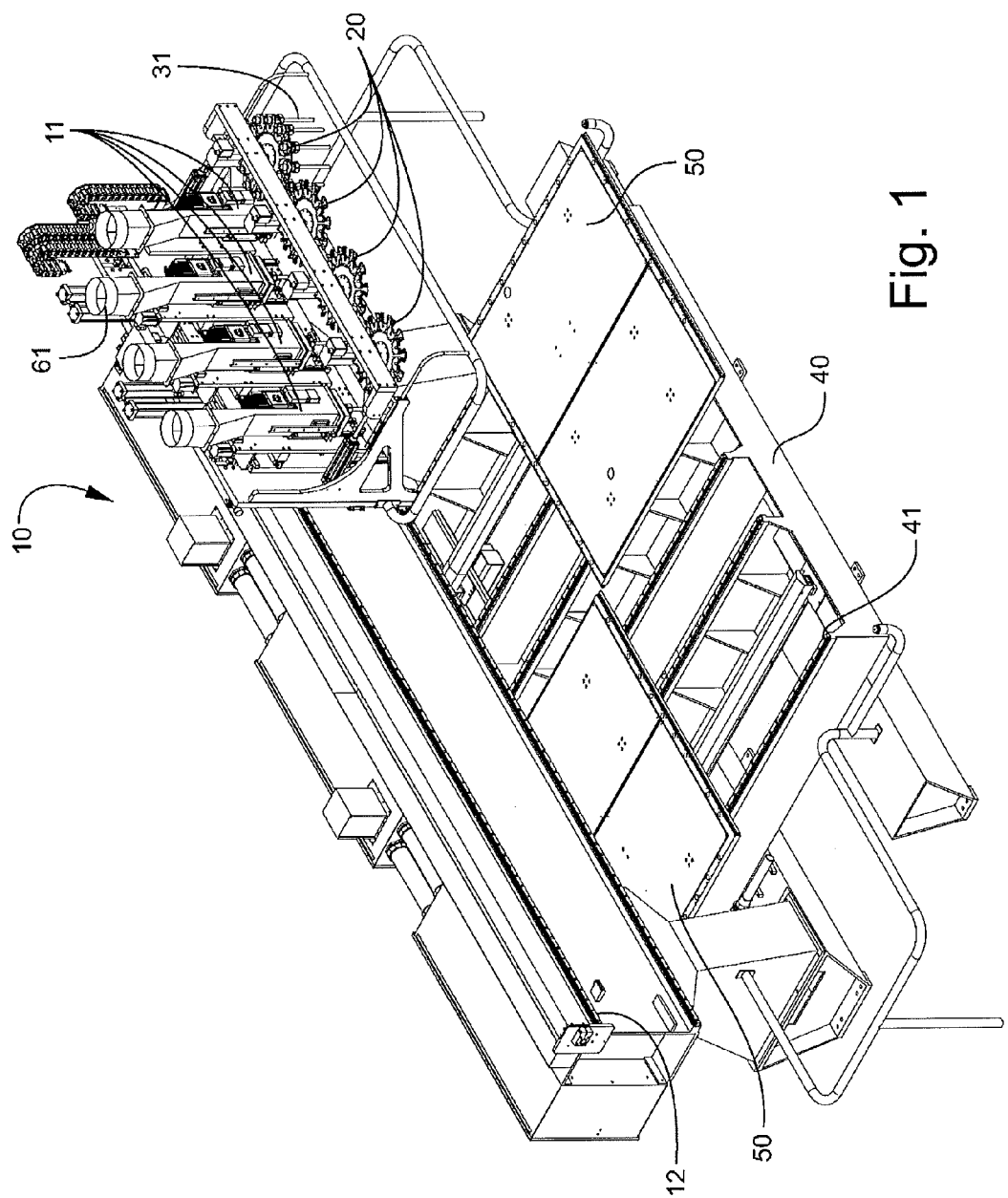

MULTIPLE TOOL CHANGER FOR MACHINING CENTER

CROSS-REFERENCE TO RELATED APPLICATION

This application claims priority to U.S. Provisional Application No. 61/656,621 filed Jun. 7, 2012, the entirety of which is incorporated by reference herein.

TECHNICAL FIELD AND BACKGROUND OF THE INVENTION

The present invention relates generally to the field of machine tools, and more particularly, to the field of automated machining centers utilizing multiple tools that simultaneously operate on one or more workpieces.

Machine tools have been in use for centuries. Rotary filing machines date at least to the eighteenth century with milling machines appearing a short time thereafter. Automation began in the early twentieth century, and by the late twentieth century computers were commonly utilized to control automation. Presently, it is common for a numerically controlled automated machine tool to operate with multiple tools functioning at the same time on one or more workpieces.

For instance, in a manufacturing process where milling of a workpiece is necessary, the workpiece is typically held on a table and the machine utilizes one, two, three, four, or more spindles each securing a tool. The spindles may be connected to one another and move together in parallel motion. The table may move in the x-y plane and the spindles of the machine along the z axis. The table may also move in the x-y plane as well as along another axis or multiple other axes and/or the spindles may also move in the x-y plane. Thus, it is possible to machine a 2-D or 3-D workpiece along multiple axes.

As refinement of the computer driven automation of machine tools has advanced, so has the ability to adapt machines for multiple tools. Rather than having multiple machines wherein the spindles of a particular machine each hold only one tool, spindles may be made adaptable to multiple tools. For some time, tools in a spindle were required to be manually changed, for instance, if a tool became damaged or required sharpening/adjustment or if a different tool was desired. With advances in computerized automation, a machine may contain a magazine of tools wherein the spindle is adapted to cooperate with the magazine and automatically change tools as programmed. Magazines are typically located near the spindle, contain multiple tools, and are rotatable such that as it rotates a tool can be removed from the spindle and a different tool placed in the spindle. Spindles may be moved between use and loading positions.

Because a spindle may be adaptable to many different sizes and types of tools, the size of the magazines can vary. When magazines are large in order to contain a large number of tools, they gain flexibility in being able to perform many different functions with individual spindles acting in a single machine tool. A magazine may be supplied with tools allowing the spindle to drill, cut, grind, mill, punch, etch, etc., by rotating the magazine to a different position. However, by adding tools to a magazine and thereby increasing magazine size, efficiency of the operation on the workpiece may suffer because large magazines require spindles to be separated by a greater distance. In other words, spacing between spindles is directly impacted by magazine size. Spacing can become an important factor with respect to waste material from a workpiece. For example, four spindles may operate on a flat workpiece, with each spindle cutting a portion of the workpiece. Because of the minimum spacing required between spindles, voids are present between spindles in which the workpiece cannot be worked on, resulting in waste product.

Thus, there exists a need for a machining center that permits a wide range of tools to be utilized by each spindle while permitting multiple spindles to function at a relatively close distance to one another, thereby reducing waste.

BRIEF SUMMARY OF THE INVENTION

It one aspect, the presented invention is directed to a numerically controlled machining center configured to reduce the waste associated with performing work on a workpiece.

In another aspect, the machining center includes a plurality of machine tool spindles (hereinafter "spindles"), wherein each spindle is movable and configured to access at least one magazine of a plurality of magazines holding a plurality of tools for working the workpiece.

In a further aspect, the center of each of the magazines is located at a first distance apart from the center of an adjacent magazine or magazines.

In a further aspect, each spindle is configured to load a selected tool from a magazine and then detach and move toward (i.e. closer) to an adjacent spindle such that once positioned, the center of each spindle is a second distance apart from the center of an adjacent spindle, wherein the second distance is less than the first distance.

In a further aspect, loaded, adjacent spindles are closer together than their respective magazines are to adjacent magazines.

In a further aspect, the machining center is configured to operate in a tool loading position where the magazines rotate and tools are changed, a working position where tools do work to a workpiece, and an intermediate position where the spindles move through a series of positions from the loading position to the working position or from the working position to the loading position.

In a further aspect, in the intermediate position the spindles move in the direction toward one another (i.e., closer together) before starting work on the workpiece, or move away from one another (i.e., further apart) after performing work on the workpiece.

In a further aspect, a machining center is provided herein wherein magazines and spindles are respectively arranged in a plane or in a plurality of parallel planes.

In a further aspect, a machining center is provided herein wherein the second distance can be programmed to vary from one spindle to another adjacent spindle.

In a further aspect, the workpiece is held by a table positioned beneath the spindles that may be numerically programmed to automatically move along one or more of the x and y axes.

In a further aspect, the table moves along a plurality of axes and/or at various angles with respect to the spindles.

In a further aspect, each of the plurality of spindles may move along one or more of the x, y and z axes.

In a further aspect each of the plurality of spindles may move along a plurality of axes and/or at various angles with respect to the table.

In a further aspect, the plurality of spindles are surrounded by a debris vacuum system for removing bits of debris collected as a byproduct of the machining process during the working position.

To achieve the foregoing and other aspects and advantages, in one embodiment provided herein is a numerically controlled machining center for performing work on a workpiece including a plurality of magazines wherein each magazine holds a plurality of tools for performing work on the workpiece, wherein each magazine is positioned at a first distance from an adjacent magazine determined by the size, number and types of tools held in each magazine, a plurality of spindles, equal in number to the plurality of magazines and mounted for movement relative to one another independent of the positions of the magazines, the plurality of spindles operable for grasping and securing a tool from the magazines while the spindles are spaced from one another, wherein each spindle is moveable to a second distance apart from an adjacent spindle when work is performed on the workpiece, the second distance being less than the first distance for permitting the spindles to work relatively close together to minimize waste, and a support for holding the workpiece.

In a further embodiment, the plurality of spindles are movable between a loading position for loading a tool, a working position for performing work on the workpiece, and an intermediate position between the loading position and the working position, wherein the plurality of spindles are farthest apart in the loading position and closest together in the working position.

In a further embodiment, the first distance is measured between centers of adjacent magazines and the second distance is measured between centers of adjacent spindles, and wherein the second distance is less than the first distance when the plurality of spindles are positioned in the working position.

In a further embodiment, the machining center includes a CNC controller and a PLC controller for controlling rotation of the plurality of magazines, tool loading and movement of the plurality of spindles relative to the magazines and to one another, among other functions.

In another embodiment, provided herein is a numerically controlled machining center for performing work on a workpiece including a plurality of magazines holding a plurality of tools, each magazine positioned a first distance from an adjacent magazine, a plurality of spindles equal in number to the number of magazines and movable relative to one another independent of the positions of the magazines, the spindles movable configured to move apart from one another in a tool loading position and movable toward one another in a working position to allow the tools to be spaced apart during tool loading to accommodate for a large magazine size and work close together to minimize waste, and a table for supporting a workpiece.

In a further embodiment, the distance between adjacent magazines is greater than the distance between adjacent spindles when the adjacent spindles are positioned in the working position, and the distance between adjacent spindles is greater in the tool loading position than in the working position.

In yet another embodiment, provided herein is a method for controlling the loading and movement of spindles in a machining center including the steps of providing a machining center including a plurality of magazines each holding a plurality of tools, a plurality of spindles equal in number to the plurality of magazines and movable relative to the magazines and one another independent of the positions of the magazines, and a table for supporting a workpiece, providing a CNC controller and a PLC controller for controlling rotation of the plurality of magazines, tool loading and movement of the plurality of spindles relative to the magazines and to one another, transferring tools from the plurality of magazines to the plurality of spindles in a loading position of the machining center, and moving the plurality of spindles apart from one another as the plurality of spindles move between the loading position and a working position for performing work on the workpiece.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description is read with reference to the accompanying drawings, in which:

FIG. 1 is a perspective view of a machining center according to one embodiment of the invention and including four spindles, four magazines, a table and two workpieces;

DETAILED DESCRIPTION OF THE INVENTION

Figure 1A:
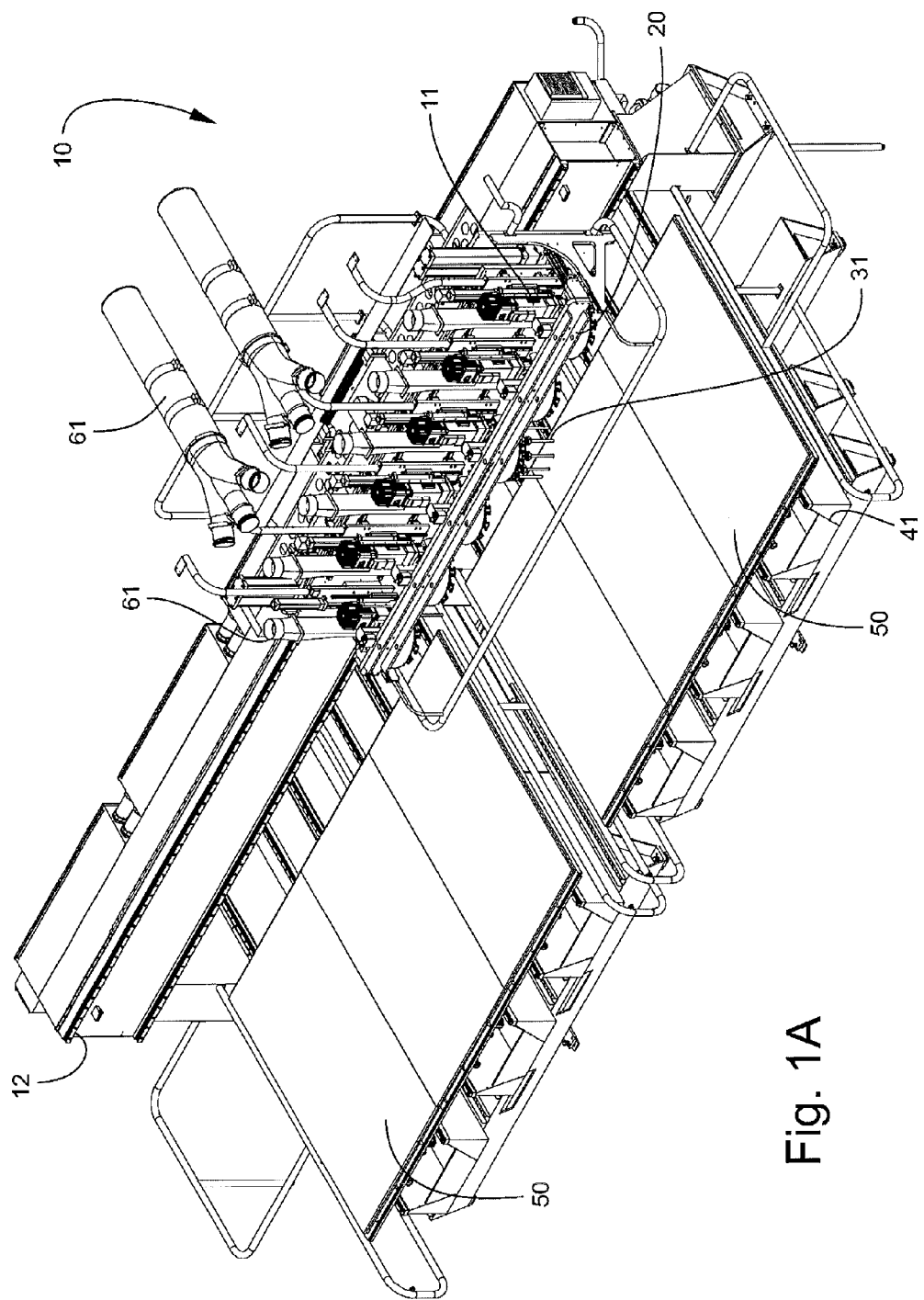
FIG. 1A is a perspective view of a machining center according to another embodiment of the invention and including six spindles, six magazines, a table and two workpieces.
Figure 2:
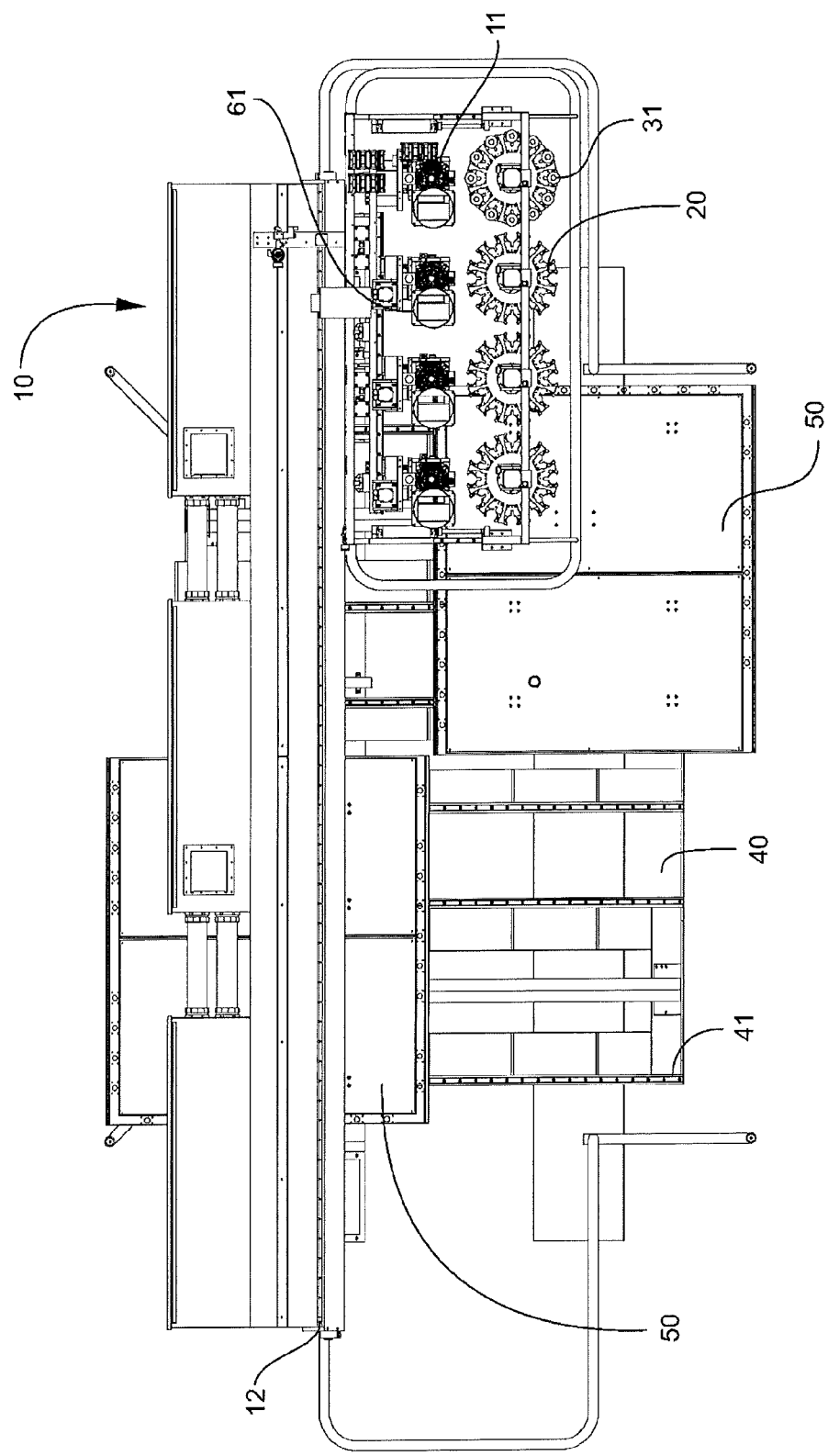
FIG. 2 is a top plan view of the machining center of FIG. 1.
Figure 3:
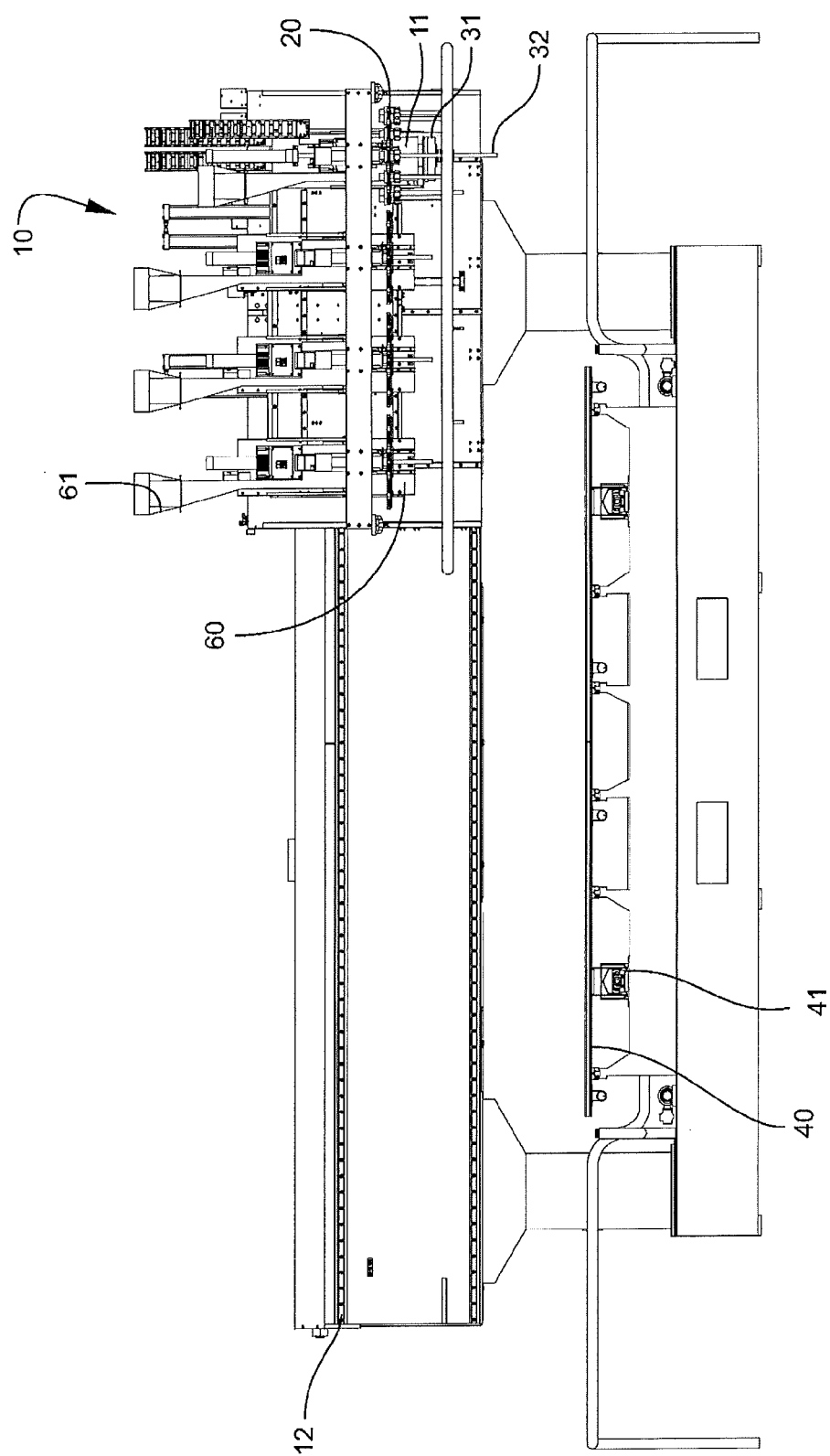
FIG. 3 is a front elevation view of the machining center of FIG. 1.
Figure 4:
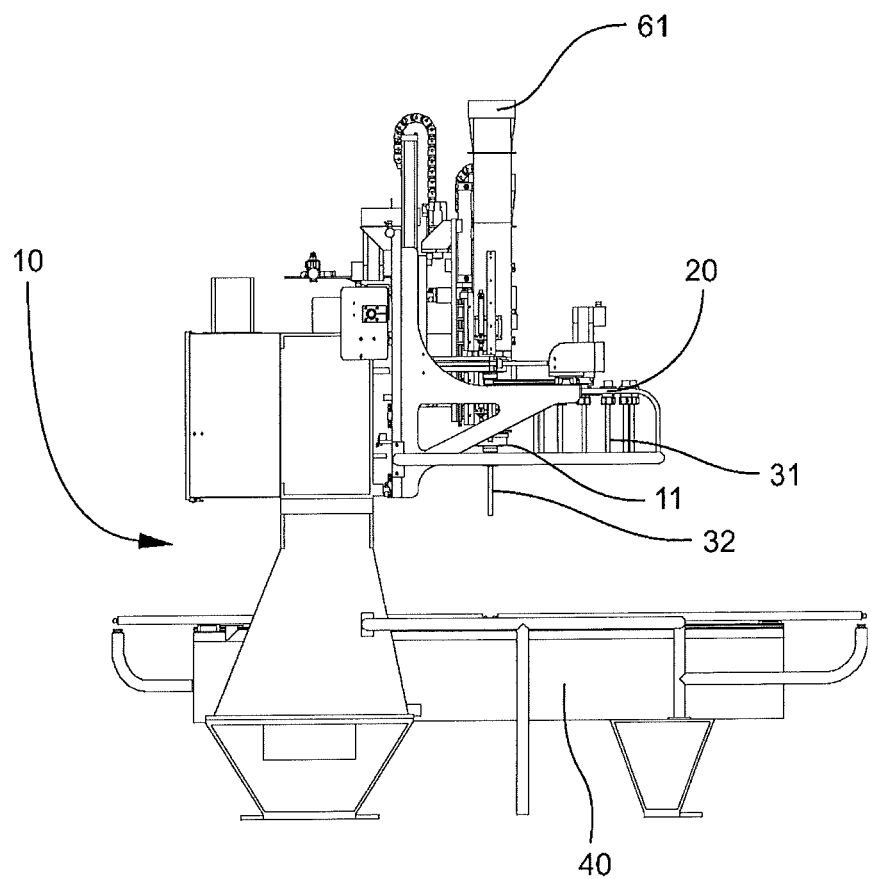
FIG. 4 is a side elevation view of the machining center of FIG. 1.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring now to the drawings, FIGS. 1-4 illustrate a machining center 10 generally including a plurality of spindles 11, a plurality of magazines 20, a plurality of tools 31 in each magazine 20, a table 40, a set of table rails 41, a set of spindle rails 12, a plurality of workpieces 50, a debris collection hood 60, and a debris collection conduit 61. Each spindle 11 is loaded with a preselected tool 32 from the plurality of tools 31. The machining center 10 is shown FIGS. 1-4 in a tool loading position with the spindles 11 acting in cooperation with the magazines 20. Tools 31 are loaded into a magazine 20 and are ready to be transferred from the magazine 20 to the spindles 11.

Figure 6:
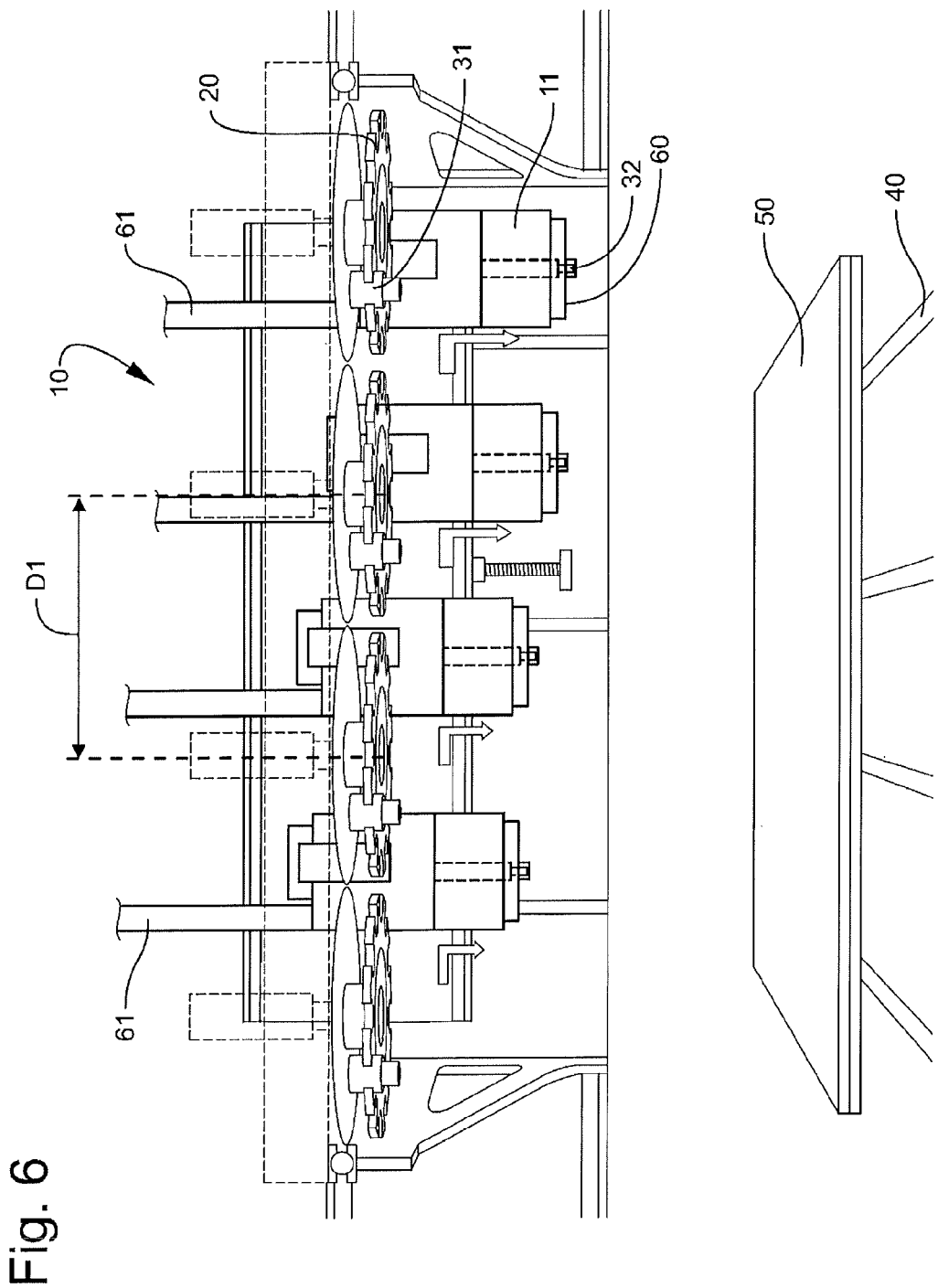
FIG. 6 is a front perspective view of a machining center illustrating an intermediate position wherein a tool has been loaded and spindles moving closer together and towards the workpiece.

One or more workpieces 50 are loaded onto the table 40. Table 40 has table rails 41 that allow the table to move along the y axis. The machining center 10 may additionally be configured to move the table along one or more the x, y and z axes. The plurality of spindles 11 move along a set of spindle rails 12 along the x axis. The machining center 10 may also be configured to move the spindles along one or more of the x, y and z axes, as shown in FIG. 6. FIGS. 1-4 also show debris conduits 61 that carry debris collected from debris collection hoods 60 as the spindles 11 and tool 32 perform work on the workpieces 50. FIG. 1A shows an alternative embodiment of a machining center including additional spindles 11.

The spindles 11 of the machining center 10 are configured to be numerically programmed to move closer to each other after disengaging from the magazines 20. FIGS. 5-10 show various stages of movement of the spindles between a tool loading position (see FIGS. 5 and 6) and a working position (see FIGS. 7 and 8), through a series of intermediate positions (see FIG. 9). In other words, the spindles 11 are positioned farthest apart in the tool loading position to accommodate for large magazine size and spacing, and closest together in the working position to permit the tools to operate close together to minimize waste. In the intermediate positions the tools may be moving apart and/or in the direction of one of the magazines and the workpiece.

Figure 5:
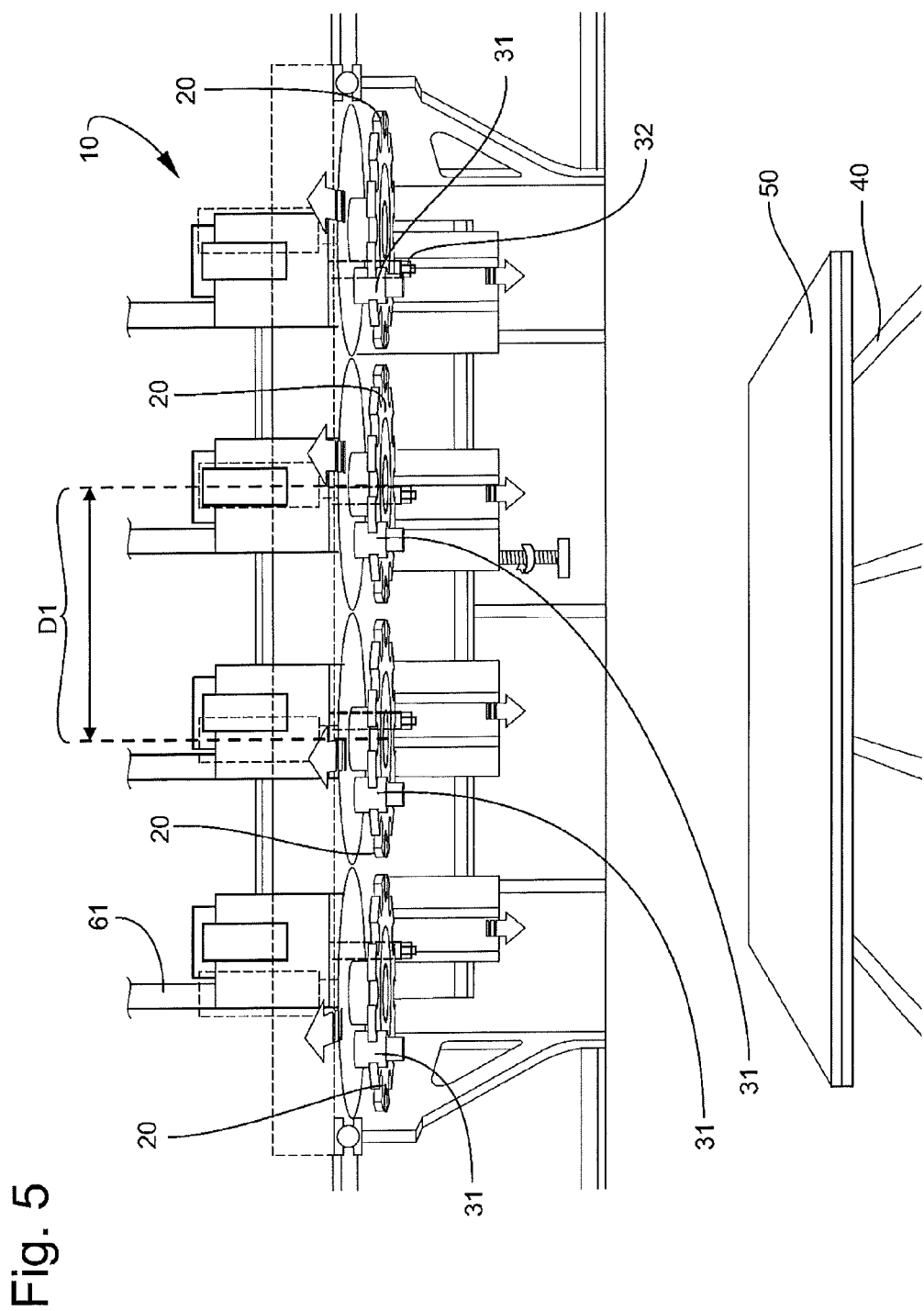
FIG. 5 is a front perspective view of a machining center illustrating the spindle loading position.

FIG. 5 shows the machining center 10 where the spindles 11 have begun to disengage from the magazines 20. Tools 31 remain in the magazines 20 and tools 32 have been loaded into the spindles 11. The magazines 20 are, and remain throughout the movement, a first distance D1 apart from one another. Distance D1 may be determined by one or more of magazine size, tool size, types of tools in the magazines, number of tools in the magazines, etc.

FIG. 6 shows the machining center 10 where the spindles 11 have begun to move downward and towards the right as part of the intermediate position. The distance D1 between the magazines 20 remains the same.

Figure 7:
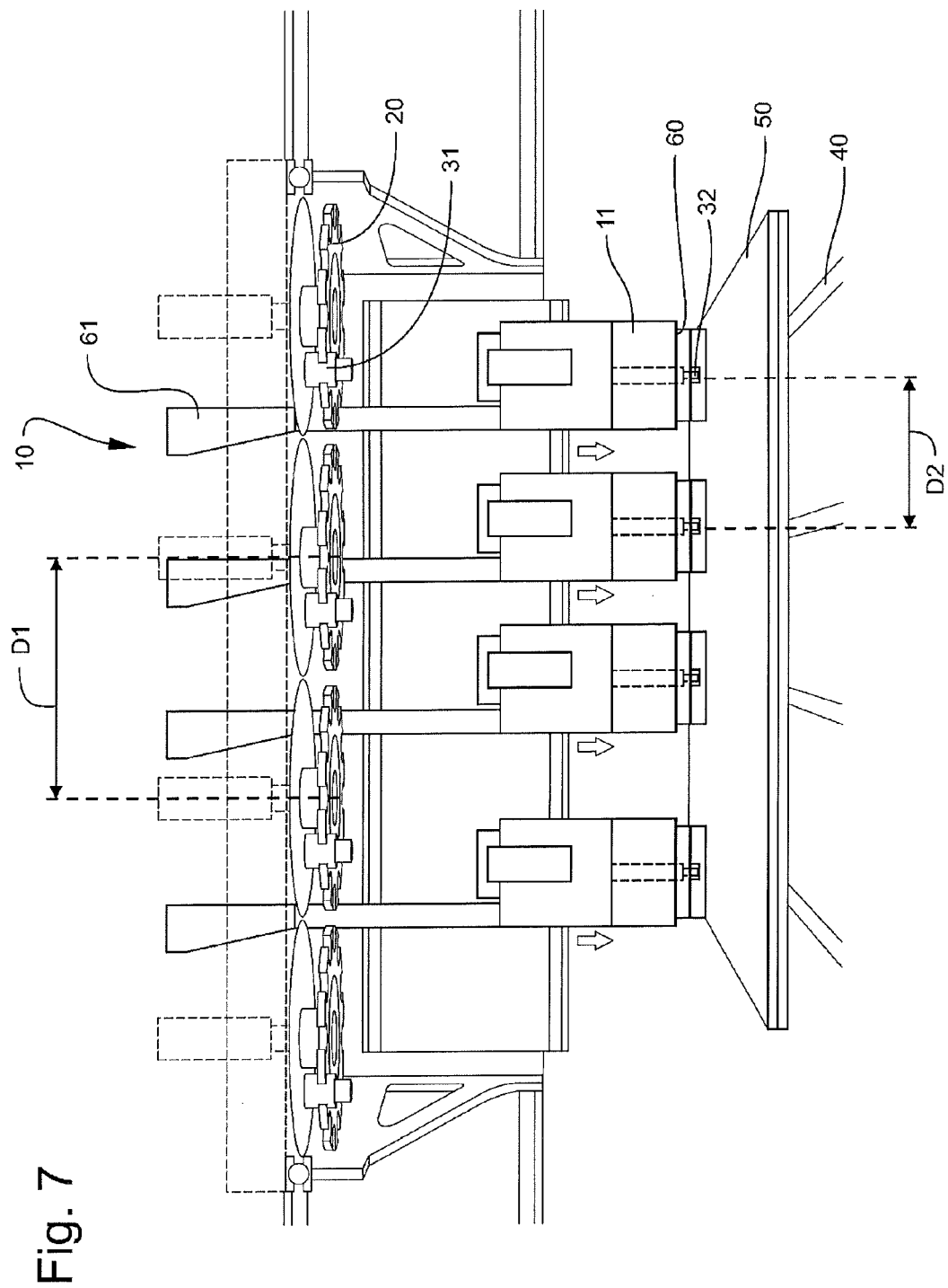
FIG. 7 is a front perspective view of a machining center illustrating first distance (D1) between magazine centers and second distance (D2) between spindle centers in the intermediate position.

FIG. 7 shows the machining center 10 where the spindles 11 have moved further downward and to the right such that the distance D2 between the spindles is smaller (i.e., less) than the distance D1 between the magazines 20. The tools 32 in the spindles 11 are nearly in contact with the workpiece 50 resting on the table 40. Also, the debris collection hood 60 surrounds the tool 32 so as to prepare to collect debris produced from the machining process. This debris will be collected through the debris collection hood 60 and be passed and channeled through the debris collection conduits 61.

Figure 8:
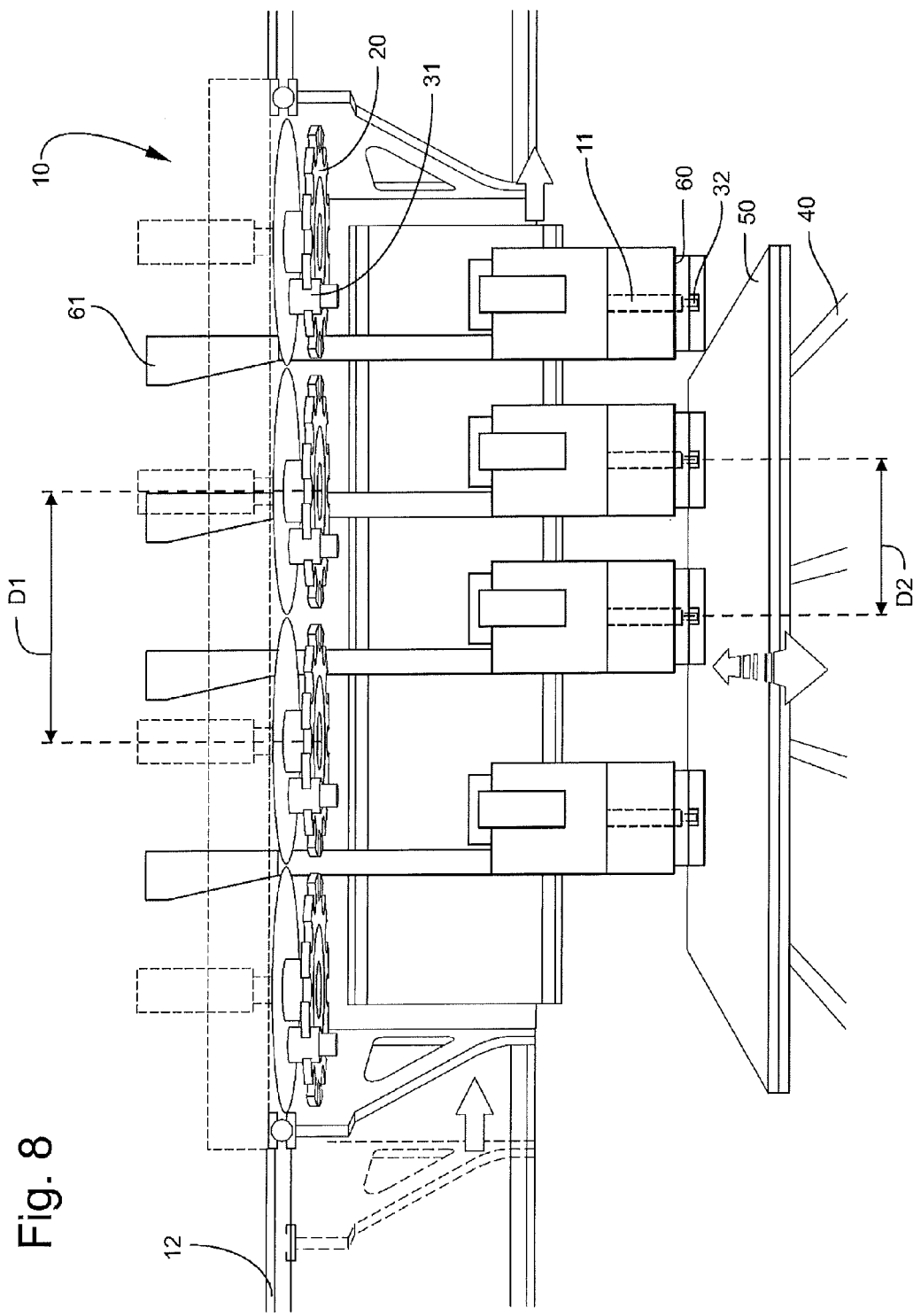
FIG. 8 is a front perspective view of a machining center illustrating a working position and x- and y-axis movement.

FIG. 8 shows the machining center 10 in the working position where tools 32 are loaded in the spindles 11 and are performing work on the workpiece 50. The debris collection hoods 60 are vacuuming debris and passing the debris through the debris collection conduit 61. The magazines 20 remain the same distance D1 apart and the spindles are a smaller distance D2 apart from one another. The table 40 moves the workpiece 50 along a y axis. The spindles 11 move together along the spindle rails 12 along an x axis. The magazines 20 remain loaded with additional tools 31.

Figure 9:
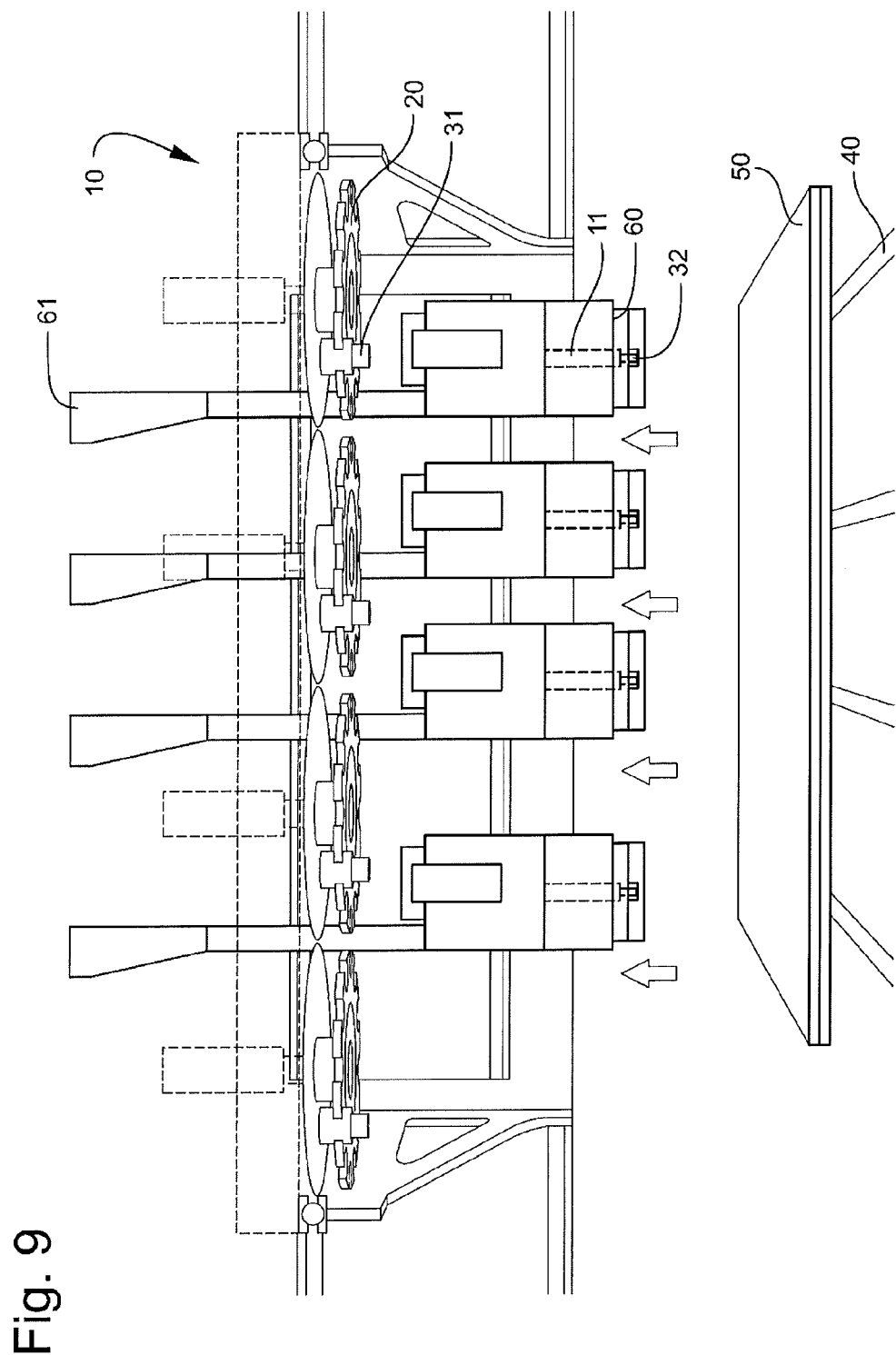
FIG. 9 is a front perspective view of a machining center illustrating an intermediate position wherein the plurality of spindles move apart and in a direction away from the workpiece.

FIG. 9 shows the machining center 10 in the intermediate position, returning from the working position shown in FIG. 8 to the loading position of FIG. 5. The tool 32 that has completed working on the workpiece 50 is still loaded in the spindle 11. The debris collection hood 60 is moving upward with the spindle 11. Tools 31 remain in the magazine 20 and are ready to be loaded into the spindles 11 once the spindles 11 reach the loading position and unload existing tools 32 back into the magazines 20.

Figure 10:
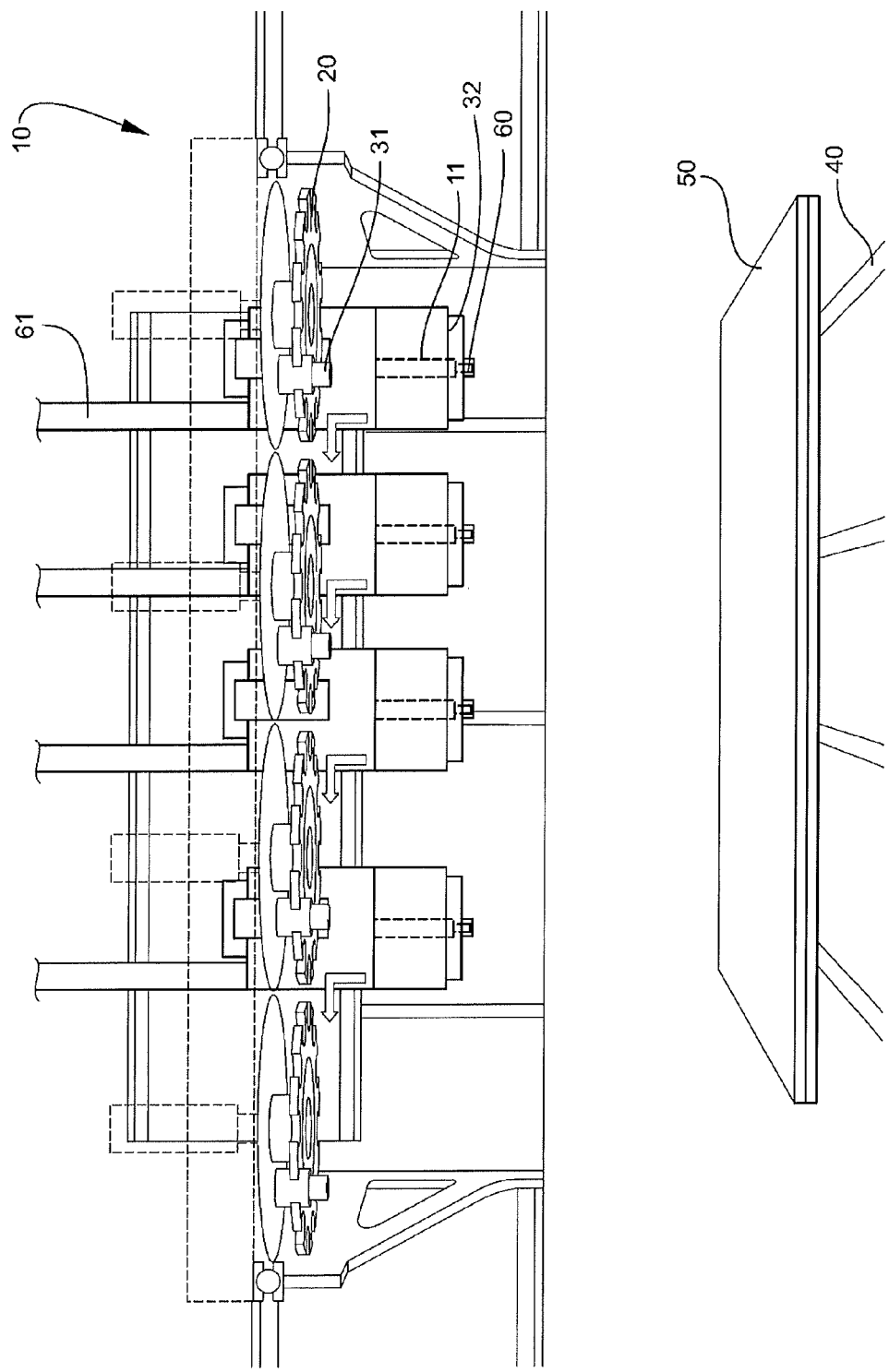
FIG. 10 is a front perspective view of a machining center illustrating an intermediate position wherein tools have completed work on the workpiece and are returning to the loading position.

FIG. 10 shows the machining center 10 in the intermediate position, returning from the working position shown in FIG. 8 to the loading position shown in FIG. 5. The spindles 11 are moving upward and to the left. The tool 32 that has completed working on the workpiece 50 is still loaded in the spindle 11. The debris collection hood 60 is moving upward and leftward with the spindle 11. Tools 31 remain in the magazines 20 and are ready to be loaded into the spindles 11 once the spindles 11 reach the loading position and unload existing tools 32 back into the magazines 20.

Each magazine 20 and spindle 11 may be provided with a respective computer numeric controlled (CNC) controller and respective programmable logic controller (PLC), which may also be single controllers with different channels. The controllers receive signals (information) relating to the current status and positional information of the spindles and magazines. On the basis of this information, the PLC controller controls the removal of a tool from, and the return of a tool to, its respective magazine and the loading and unloading of the spindles. CNC and PLC controllers are well known in the field of machine control.

The foregoing description provides embodiments of the invention by way of example only. It is envisioned that other embodiments may perform similar functions and/or achieve similar results. Any and all such equivalent embodiments and examples are within the spirit and scope of the present invention and are intended to be covered by the appended claims.

What is claimed is:

1. A numerically controlled machining center for performing work on a workpiece, comprising:
  (a) a plurality of magazines, each magazine of the plurality of magazines holding a plurality of tools for performing work on the workpiece, each magazine of the plurality of magazines being positioned at a first fixed distance from an adjacent magazine of the plurality of magazines, the first fixed distance being determined by one or more of magazine size, tool types and number of tools;
  (b) a plurality of spindles, mounted separate from the plurality of magazines, and equal in number to the plurality of magazines, each spindle of the plurality of spindles arranged to move independently between a working position proximate the workpiece and a tool loading position proximate a respective magazine of the plurality of magazines, wherein a distance between adjacent spindles of the plurality of spindles when the adjacent spindles are in the tool loading position is greater than a distance between the same adjacent spindles when the same adjacent spindles are in the working position, and wherein the plurality of spindles and the plurality of magazines are all carried on a common moving gantry movable along a y axis; and (c) a support for holding the workpiece;

wherein movement of each spindle of the plurality of spindles between the tool loading position and the working position includes movement along the y axis and a z axis; and wherein each magazine of the plurality of magazines is mounted above and axially off-center relative to a respective one of the plurality of spindles such that each spindle moves vertically upward and horizontally to engage a tool held in a corresponding one of the magazines to load one of the plurality of tools.

2. The machining center of claim 1, wherein each spindle of the plurality of spindles is movable between the tool loading position for loading a tool, the working position for performing work on the workpiece, and at least one intermediate position between the tool loading position and the working position.

3. The machining center of claim 2, wherein the adjacent spindles are farthest apart when both are in the tool loading position and closest together when both are in the working position.

4. The machining center of claim 2, wherein the first fixed distance is measured between centers of adjacent magazines of the plurality of magazines.

5. The machining center of claim 1, wherein each magazine of the plurality of magazines is rotatable to position a preselected tool for loading a respective spindle of the plurality of spindles.

6. The machining center of claim 1, wherein each spindle of the plurality of spindles is movable along one or more of x, y and z axes.

7. The machining center of claim 1, wherein the support for holding the workpiece is movable along one or more of x, y and z axes.

8. The machining center of claim 1, wherein the support for holding the workpiece is a table.

9. A numerically controlled machining center for performing work on a workpiece, comprising:

(a) a plurality of magazines, each magazine of the plurality of magazines holding a plurality of tools, wherein adjacent magazines of the plurality of magazines are positioned at a first fixed distance apart;

(b) a plurality of spindles, mounted separate from the plurality of magazines, and equal in number to the plurality of magazines, each spindle of the plurality of spindles configured to move independently between a working position proximate the workpiece and a tool loading position proximate a respective magazine of the plurality of magazines, wherein adjacent spindles of the plurality of spindles move apart from each other as the adjacent spindles travel toward the tool loading position, and wherein the plurality of magazines and the plurality of spindles are carried on a common moving gantry movable along a y axis; and (c) a table for supporting a workpiece; and wherein movement of each spindle of the plurality of spindles between the tool loading position and the working position includes movement along the y axis and a z axis; and wherein each magazine of the plurality of magazines is mounted above and axially off-center relative to a respective one of the plurality of spindles such that each spindle moves vertically upward and horizontally to engage a tool held in a corresponding one of the magazines to load one of the plurality of tools.

10. The machining center of claim 9, wherein the first fixed distance between adjacent magazines of the plurality of magazines is greater than a distance between the adjacent spindles when the adjacent spindles are in the working position.

11. The machining center of claim 9, wherein a distance between the adjacent spindles is greatest when the adjacent spindles are in the tool loading position.

12. The machining center of claim 9, wherein one or more of the plurality of spindles and the table are movable along one or more of x, y and z axes.

* * * * *